United States Patent [19]

Nakano et al.

[11] Patent Number: 5,817,284
[45] Date of Patent: Oct. 6, 1998

[54] METHOD FOR DECOMPOSING HALIDE-CONTAINING GAS

[75] Inventors: Hisaji Nakano; Nobuhiko Matsuoka; Tetsuo Ueda; Shinsuke Nakagawa, all of Ube, Japan

[73] Assignee: Central Glass Company, Limited, Yamaguchi, Japan

[21] Appl. No.: 738,588

[22] Filed: Oct. 29, 1996

[30] Foreign Application Priority Data

Oct. 30, 1995 [JP] Japan ..................................... 7-281469
Jul. 19, 1996 [JP] Japan ..................................... 8-190983

[51] Int. Cl.⁶ ............................ B01D 53/68; B01D 53/70
[52] U.S. Cl. ...................... 423/240 S; 423/219; 588/206; 588/248
[58] Field of Search ........................... 423/240 R, 240 S, 423/241, 219; 588/206, 248

[56] References Cited

U.S. PATENT DOCUMENTS

| | | | |
|---|---|---|---|
| 1,490,546 | 4/1924 | Thorssell et al. ........................ | 423/219 |
| 3,699,209 | 10/1972 | Ward ........................................ | 423/240 |
| 4,654,203 | 3/1987 | Maurer et al. ........................... | 423/240 |
| 5,416,247 | 5/1995 | Webster ................................... | 588/206 |

FOREIGN PATENT DOCUMENTS

| | | | |
|---|---|---|---|
| 0 261 950 A2 | 3/1988 | European Pat. Off. . | |
| 0 556 717A1 | 8/1993 | European Pat. Off. ............... | 423/231 |
| 3826971A1 | 2/1990 | Germany . | |
| 50-6440 | 3/1973 | Japan .................................... | 423/219 |
| 53-78999 | 7/1978 | Japan ................................ | 423/240 R |

OTHER PUBLICATIONS

Database WPI, Section Ch, Week 9644, Derwent Publications Ltd. London, GB; Class E37, AN 96–437524, XP002024980 for JP–A–08 215 538 (Central Glass Co., Ltd.), Aug. 27, 1996 (abst.).

Patent Abstracts of Japan, vol. 011, No. 038 (C–401), Feb. 4, 1987 for JP–A–61 204025 (Central Glass Co., Ltd.), Sep. 10, 1986.

Mizuno, "About Decomposition of Fluorine", *Bosei Kanri* (Rustproof Management), No. 11, pp. 7–13 (1992) no month.

Urano, "Decomposition of Chlorofluorocarbons", *Kagaku Sosetsu* (Chemistry Review), No. 11, pp. 144–158 (1991) no month.

Fukunaga et al., "Reactivity of Activated Carbon to Which Exhaust Gas of Semiconductor Production Has Adsorbed", *25th Anzen Kogaku Kenkyu Happyoukai Koen Yokoshu* (Papers presented in 25th Meeting of Safety Engineering), pp. 19–22 (1992) no month.

Johnson et al. "A Closed–Cycle Gas Recirculating . . . " Appl. Phys. Lett. 32(5) pp. 291–292, Mar. 1978.

*Primary Examiner*—Gary P. Straub
*Assistant Examiner*—Timothy C. Vanoy
*Attorney, Agent, or Firm*—Evenson, McKeown, Edwards & Lenahan, PLLC

[57] ABSTRACT

The present invention relates to a method for decomposing any of chlorocarbons, chlorofluorocarbons, perfluorocarbons and $SF_6$ contained in a gas. This method includes the step of bringing the gas into contact, at a temperature of at least 300° C., with a first mixture consisting essentially of 0.05–40 wt % of potassium hydroxide and at least one compound selected from the group consisting of alkali-earth-metal oxides and alkali-earth-metal hydroxides, for decomposing the at least one halide compound. When the halide compound-containing gas further contains oxygen, this gas may be brought into contact, at a temperature of at least 500° C., with at least one first substance selected from the group consisting of active carbon, iron powder and nickel powder, for removing the oxygen from the gas, prior to the halide compound decomposition. When the halide compound-containing gas still further contains a strong oxidizing gas (e.g., fluorine), this gas may be brought into contact, at a temperature of at least 300° C., with at least one second substance selected from the group consisting of Si, Ti, Ge, W, Mo, Fe, Mn, Co, Zn, Sn, B, Zr and compounds of these elements, except oxides of these elements, such that the oxidizing gas turns into a compound that is not reactive with the at least one first substance. According to this method, it is possible to decompose halide compounds contained within a gas, using a smaller equipment, at a lower temperature, as compared with conventional methods.

18 Claims, No Drawings

METHOD FOR DECOMPOSING HALIDE-CONTAINING GAS

BACKGROUND OF THE INVENTION

This invention relates to a method for effectively decomposing a halide-containing gas, thereby to make the gas harmless to the earth's environment. Examples of halides to be decomposed by this method are organic halides containing fluorine, chlorine and bromine, such as chlorofluorocarbon, perfluorocarbon and chlorocarbon, and inorganic halides such as $SF_6$.

Chlorofluorocarbon (CFC) is very useful as cleaner in dry cleaning, solvent, aerosol propellant, refrigerant, forming agent, etc. On the other hand, CFC released into the atmosphere, because of its chemical inertness, can diffuse unchanged into the stratosphere. Here, CFC is decomposed by ultraviolet rays of sunlight to release chlorine atoms. These atoms, which are highly reactive, catalyze the destruction of ozone, thereby causing depletion of the ozone layer. In view of this characteristic of CFC, the use of specific freons of CFCs, which are highly destructive to ozone, has been limited stepwise in recent years. There is an international project in progress to totally ban specific freons from 1996.

In addition to the ozone layer destruction, CFC is believed to contribute to the global warming. Besides CFC, perfluorocarbon (PFC) is also believed to contribute the same. PFC has increasingly been used as etching agent, dry cleaning agent, etc. in semiconductor industry. The heat emission characteristic of PFC causing the greenhouse effect is similar to that of CFC. The amount of use of PFC is smaller than that of CFC. PFC, however, attracts more attention than CFC does, because the life of PFC is longer than that of CFC in the atmosphere. PFC has a considerable chemical inertness. Therefore, it is said that PFC is decomposed by nothing but ultraviolet rays that have wavelengths not longer than 130 nm, pouring into an atmospheric layer of very high altitude. PFC is said to have a great influence on the greenhouse effect. In fact, there is a calculation that PFC has a life of from several thousands of years to tens of thousands of years in the atmosphere, in contrast with that CFC has a life of several hundreds of years in the atmosphere. Thus, it is strongly demanded to destroy PFC and CFC after their use, without releasing them into the atmosphere.

There are four conventional methods for destroying halide-containing gases such as CFC and PFC, which have been put into practical use or are examined for practical use, as described in a journal of Bosei Kanri (written in Japanese) 11, pp. 7–13 (1992) and in a journal of Kagaku Sosetsu (written in Japanese) No. 11, pp. 144–158 (1991). The first method is a plasma destruction in which a halide-containing gas is decomposed in a high-frequency plasma having a temperature higher than 10,000° C. in the presence of water. However, the size of facility for this method is necessarily large, and thus the investment money therefor becomes considerable. The second method is a supercritical hydrolysis in which a halide-containing gas is hydrolyzed by supercritical water of high temperature and high pressure. This method has the same drawback as that of the first method. The third method is a catalytic process in which a halide-containing gas is allowed to flow through a catalyst layer maintained at a high temperature. This method has a drawback that the catalyst deteriorates after a certain period of time. The fourth method is pyrolysis in which a halide-containing gas is directly decomposed by heat of heater or combustion gas. In this method, for example, $CF_4$ is decomposed only by a high temperature of from 1,000° to 1,200° C. This temperature may damage the reactor.

Thus, there is a demand for a superior decomposition method for halide-containing gases in order to make the gases harmless.

SUMMARY OF THE INVENTION

It is therefore an object of the present invention to provide a method for decomposing a halide-containing gas in order to make the gas harmless, using a smaller equipment, at a lower temperature, as compared with conventional methods.

It is another object of the present invention, when a halide-containing gas further contains oxygen, to provide a method for removing oxygen from the halide-containing gas, prior to the halide decomposition.

It is still another object of the present invention, when a halide-containing gas further contains oxygen and a strong oxidizing or oxidative gas (e.g., fluorine gas), to provide a method for effectively and safely removing oxygen from the halide-containing gas, prior to the halide decomposition.

According to a first aspect of the present invention, there is provided a first method for decomposing a halide contained in a gas, the method comprising the step of:

(a) bringing the gas into contact, at a temperature of at least 300° C. (preferably from 300° to 900° C.), with a mixture consisting essentially of 0.05–40 wt % of potassium hydroxide and at least one compound selected from the group consisting of alkali-earth-metal oxides and alkali-earth-metal hydroxides. This method belongs to a pyrolysis which is characterized in that the decomposition temperature can be considerably lower than that of the conventional pyrolysis methods. We unexpectedly found that the above-mentioned mixture is very effective in pyrolyzing the halide-containing gas and in making the same harmless.

When the gas used in the first method is a mixture of a halide gas and an inert gas such as nitrogen gas and/or argon gas, the halide gas is very effectively decomposed by the first method. However, we found that, when the gas used in the first method contains oxygen gas together with a halide gas, the decomposition of this halide gas is considerably impeded by this oxygen. In fact, there is widely used in the actual semiconductor industry and the like a so-called gas cleaning in which a perfluorocarbon and oxygen are introduced into a chemical vapor deposition (CVD) device having a stained inner wall, followed by irradiation of the inner wall with plasma, for cleaning the inner wall by gasifying the stains thereon. Thus, there is a need for a method for effectively decomposing a halide-containing gas, even if this gas further contains oxygen. In view of this, we unexpectedly found that a halide gas contained in this gas is effectively decomposed by a second method according to a second aspect of the present invention. The second method for decomposing a halide contained in a gas comprises the steps of:

(a) bringing the gas that further contains oxygen into contact, at a first temperature of at least 500° C. (preferably from 500° to 900° C.), with at least one substance selected from the group consisting of active carbon, iron powder and nickel powder, to remove the oxygen from the gas; and (b) bringing the gas that is free of the oxygen into contact, at a second temperature of at least 300° C. (preferably from 300° to 900° C.), with a mixture consisting essentially of 0.05–40 wt % of potassium hydroxide and at least one compound selected from the group consisting of alkali-earth-metal oxides and alkali-earth-metal hydroxides.

We unexpectedly found that the above-mentioned second method may be modified into a third method according to a third aspect of the present invention, by combining the steps (a) and (b) of the second method, roughly speaking. The third method for decomposing a halide contained in a gas comprises the step of:

(a) bringing the gas that further contains oxygen into contact, at a temperature of at least 500° C., with a mixture of at least one substance selected from the group consisting of active carbon, iron powder and nickel powder, potassium hydroxide, and at least one compound selected from the group consisting of alkali-earth-metal oxides and alkali-earth-metal hydroxides, the potassium hydroxide being in an amount of from 0.05 to 40 wt % based on the total of the potassium hydroxide and the at least one compound.

In the above-described gas cleaning of semiconductor industry and the like, the exhaust gas from the CVD device may contain a very strong oxidizing or oxidative gas (e.g., fluorine) due to the irradiation with plasma. It is known that each of fluorine gas and nitrogen dioxide gas reacts with active carbon to produce a reactive substance that is explosive, as described in a document of "25th Anzen Kogaku Kenkyu Happyoukai Koen Yokoushu" (written in Japanese) pp. 19–22 (1992). Therefore, it is dangerous to bring a gas that contains halide, oxygen, and a very strong oxidizing gas such as fluorine or nitrogen dioxide, into contact with active carbon, to remove oxygen from the gas. Other examples of such very strong oxidizing gas, other than fluorine and nitrogen dioxide, are $ClF$, $ClF_3$, $ClF_5$, $BrF_3$, $BrF_5$, $IF_5$, and $IF_7$. Thus, when at least one of these oxidizing gases has been added to a gas containing halide and oxygen, from outside, it is also dangerous to bring this gas into contact with active carbon. In view of this, we unexpectedly found that oxygen can effectively securely be removed from this gas by a fourth method according to a fourth aspect of the present invention. The fourth method for decomposing a halide contained in a gas comprises the steps of:

(a) bringing the gas that further contains oxygen and an oxidizing gas (e.g., fluorine) other than the oxygen, into contact, at a first temperature of at least 300° C. (preferably from 300° to 800° C.), with at least one first substance selected from the group consisting of Si, Ti, Ge, W, Mo, Fe, Mn, Co, Zn, Sn, B, Zr and compounds of these elements, except oxides of these elements, such that the oxidizing gas turns into a first compound;

(b) bringing the gas into contact, at a second temperature of at least 500° C., with at least one second substance selected from the group consisting of active carbon, iron powder and nickel powder, to remove the oxygen from the gas, the at least one second substance being unreactive with the first compound; and (c) bringing the gas that is free of the oxygen into contact, at a third temperature of at least 300° C., with a mixture consisting essentially of 0.05–40 wt % of potassium hydroxide and at least one compound selected from the group consisting of alkali-earth-metal oxides and alkali-earth-metal hydroxides. By the provision of the step (a) of the fourth method, the oxidizing gas contained in the halide-containing gas turns into a first compound that does not react with active carbon. Therefore, there is suppressed the production of the above-mentioned reactive substance that is explosive. For example, when the gas containing a strong oxidizing gas of fluorine is brought into contact, in the step (a) of the fourth method, with at least one substance selected from the group consisting of Si, Ti, Ge, W, Mo, B, and compounds of these elements, except oxides of these elements, there is produced at least one gaseous fluoride (e.g., $SiF_4$) that does not react with active carbon. As another example, when it is brought into contact, in the step (a) of the fourth method, with at least one substance selected from the group consisting of Fe, Mn, Co, Zn, Sn, Zr, and compounds of these elements, except oxides of these elements, there is produced at least one solid fluoride (e.g., $FeF_3$) that does not react with active carbon. The above-mentioned at least one gaseous fluoride, which is produced as a by-product and is harmful to the earth's environment, is also effectively decomposed by the step (C) of the fourth method. Therefore, there is no need to provide an additional step for decomposing or removing the at least one gaseous fluoride.

We unexpectedly found that the above-mentioned fourth method may be modified into a fifth method according to a fifth aspect of the present invention, by combining the steps (b) and (c) of the fourth method, roughly speaking. The fifth method for decomposing a halide contained in a gas comprises the steps of:

(a) bringing the gas that further contains oxygen and an oxidizing gas (e.g., fluorine) other than the oxygen, into contact, at a first temperature of at least 300° C. (preferably from 300° to 800° C.), with at least one first substance selected from the group consisting of Si, Ti, Ge, W, Mo, Fe, Mn, Co, Zn, Sn, B, Zr and compounds of these elements, except oxides of these elements, such that the oxidizing gas turns into a first compound; and (b) bringing the gas into contact, at a temperature of at least 500° C. (preferably from 500° to 900° C.), with a mixture of an at least one second substance selected from the group consisting of active carbon, iron powder and nickel powder, potassium hydroxide, and at least one compound selected from the group consisting of alkali-earth-metal oxides and alkali-earth-metal hydroxides, the potassium hydroxide being in an amount of from 0.05 to 40 wt % based on the total of the potassium hydroxide and the at least one compound, the at least one second substance being unreactive with the first compound.

DESCRIPTION OF THE PREFERRED EMBODIMENTS

Examples of halides to be decomposed by either of the first to fifth methods of the present invention are organic halides containing fluorine, chlorine and bromine, such as chlorofluorocarbons, perfluorocarbons and chlorocarbous, and inorganic halides such as $SF_6$.

According to the conventional pyrolysis methods and catalytic processes, the decomposition products are still harmful substances. Therefore, it is necessary to provide an additional step for making the decomposition products harmless. With this, it is difficult to make the equipment small in size and low in price. In contrast, according to the present invention, a halide-containing gas is subjected to pyrolysis and at the same time is made harmless. Therefore, it is not necessary to provide the additional step.

In the invention, the above-mentioned mixture used in the step of the halide decomposition contains, as its main component, at least one compound selected from the group consisting of alkali-earth-metal oxides and alkali-earth-metal hydroxides. This at least one compound alone is known as being effective in decomposing a halide-containing gas. In the present application, the decomposition of a halide-containing gas means the decomposition of a halide contained in this gas. However, when the at least one compound is brought into contact with a halide-containing gas, the decomposition temperature must be high. This may damage the reactor. In view of this, we unexpectedly found that, when potassium hydroxide is added to the at least one compound, the halide decomposition temperature can considerably be lowered. The reaction mechanism that a halide-containing gas is decomposed by the above-mentioned mixture is still unknown. An advantageous effect that the halide decomposition temperature is considerably lowered is unique to the addition of potassium hydroxide, because this advantageous effect was not obtained by the addition of sodium hydroxide. This advantageous effect was surely obtained by using a mixture consisting essentially of potassium hydroxide and each of calcium oxide, calcium hydroxide, magnesium oxide and magnesium hydroxide.

In the invention, the mixture used in the step of the halide decomposition may be prepared by the following nonlimitative first and second methods. In the first method, particles of an alkali-earth-metal hydroxide are immersed into a potassium hydroxide aqueous solution. Then, the particles are separated from the aqueous solution and then dried to prepare the mixture. When the halide decomposition temperature is at least 580° C., calcium hydroxide turns into calcium oxide. When the halide decomposition temperature is at least 350° C., magnesium hydroxide turns into magnesium oxide. In the invention, both of alkali-earth-metal hydroxide and alkali-earth-metal oxide bring about substantially the same advantageous effects. In the second method, potassium hydroxide is mixed with alkali-earth-metal hydroxide and/or alkali-earth-metal oxide. Then, according to need, this mixture is processed into particles or the like.

In the invention, the mixture used in the step of the halide decomposition contains 0.05–40 wt % (preferably 0.1–20 wt %), based on the total weight of this mixture, of potassium hydroxide. If it is lower than 0.05 wt %, it is not possible to obtain a satisfactory advantageous effect due to the addition of potassium hydroxide. If it is higher than 40 wt % under a condition where the decomposition temperature is higher than the melting point of potassium hydroxide, 405° C., the melted potassium hydroxide may separate from the at least one compound selected from the group consisting of alkali-earth-metal oxides and alkali-earth-metal hydroxides. With this, the melted potassium hydroxide runs down towards the reactor's bottom, resulting in clogging of the reactor.

In the step of the halide decomposition of the present invention, the manner of bringing a halide-containing gas into contact with the mixture in the form of solid is not particularly limited and may be a conventional manner of bringing a gas into contact with a solid. Here, it is optional to use a fixed bed method or a moving bed method.

In the invention, the halide decomposition temperature varies within a range of at least 300° C. (preferably 300°–900° C.), depending on the type of halide to be decomposed. Of halide gases, PFCs are classified into compounds that are hardly decomposed. Of these compounds, $CF_4$ is the hardest to be decomposed. In fact, it is necessary to increase the decomposition temperature to 1,200° C. to completely decompose $CF_4$ by a conventional pyrolysis alone. In contrast, according to the present invention, it is possible to completely decompose $CF_4$ at 900° C. Furthermore, according to the present invention, it is possible to completely decompose $CC_4$ at 400° C. It is important to choose the optimum decomposition temperature, depending on the halide type. If the decomposition temperature is higher than the optimum one, the excessive heat energy is just wasted. If it is lower than that, the halide decomposition becomes insufficient. The manner of heating the reactor to obtain the optimum decomposition temperature is not particularly limited. For example, the reactor may be heated by an electric heater from outside. After the halide decomposition, carbon that has been contained in a halide is discharged from the reactor in the form of $CO_2$ or remains in the reactor in the form of elemental carbon.

As mentioned hereinabove, when a halide-containing gas to be decomposed by the present invention further contains oxygen, but not a strong oxidizing gas (e.g., fluorine), there is used either of the second and third methods according to the present invention. In the removal of oxygen from the halide-containing gas, we unexpectedly found that oxygen is effectively removed from the gas by reducing this oxygen with a reducing agent that is selected from the group consisting of active carbon, iron powder, and nickel powder. We unexpectedly found that this halide-containing gas can effectively be decomposed by pyrolysis and be made harmless either by bringing the gas into contact with the reducing agent prior to the halide decomposition, as described in the second method of the invention, or by bringing the gas into contact with a mixture of the reducing agent, potassium hydroxide, and the at least one compound, as described in the third method of the invention.

In the invention, active carbon used for removing oxygen from a halide-containing gas may be commercial one. Commercial active carbon is prepared from a raw material such as coconut husk, coal, wood, or the like. Active carbon prepared from either of such raw materials has the deoxidation capability and thus may be used in the invention. Active carbon used in the invention may be in the form of powder, particles, or fiber. In fact, when active carbon is used in the invention, a halide-containing gas is allowed to flow through a reactor charged therewith, during the halide decomposition. Thus, it is preferable that active carbon is in the form of particles or fiber. With this, the gas pressure's decrease due to the gas flow therethrough becomes small. Iron powder and nickel powder that are used for removing oxygen from a halide-containing gas are not limited to particular types, with respect to purity and the like. These powders may be commercial ones for industrial use. In the second to fifth methods of the invention, the step of removing oxygen from a halide-containing gas is conducted at a temperature of at least 500° C., preferably from 500° to 900° C. If it is lower than 500° C., the degree of oxygen removal becomes insufficient to eliminate the adverse effect of the presence of oxygen on the halide decomposition. A temperature higher than 900° C. is not practically necessary for the oxygen removal, because it is not advantageous from viewpoint of energy cost and of selection of the reactor's material.

In either of the second and fourth methods of the invention, the reducing agent for removing oxygen from the gas and the above-mentioned mixture for decomposing a halide of the gas are respectively disposed upstream and downstream relative to each other in the reactor. Alternatively, in either of the third and fifth methods, the reducing agent and the mixture are mixed together, and the resultant mixture is put into the reactor. Then, the reactor may be heated to a suitable single temperature of at least 500° C. for both of the oxygen removal and the halide decomposition. Each of these methods is one of preferable embodiments of the present invention, because the total structure of the equipment for the halide decomposition is simplified.

As mentioned hereinabove, when a halide-containing gas to be decomposed by the present invention further contains oxygen and a strong oxidizing or oxidative gas (e.g., fluorine), there is used either of the fourth and fifth methods according to the present invention. In each of the forth and fifth methods, the halide-containing gas is brought into contact, at a temperature of at least 300° C. (preferably from 300° to 800° C.), with at least one substance selected from the group consisting of Si, Ti, Ge, W, Mo, Fe, Mn, Co, Zn, Sn, B, Zr and compounds of these elements, except oxides of these elements, such that the oxidizing gas turns into a first compound that is unreactive with the reducing agent for removing oxygen from the gas. If the temperature is lower than 300° C., the first compound is not sufficiently produced. A temperature higher than 800° C. is not practically necessary, because it is not advantageous from viewpoint of energy cost and of selection of the reactor's material.

In the fourth method of the invention, the at least one substance for converting a strong oxidizing agent, the reducing agent for removing oxygen from the gas, and the mixture for decomposing a halide of the gas are respectively disposed upstream, midstream, and downstream relative to each other in the reactor. Alternatively, in the fifth method, the reducing agent and the above mixture are mixed together, and the resultant mixture is put into the reactor, Then, the reactor may be heated to a suitable single temperature of at least 500° C. for both of the oxygen removal and the halide decomposition. This method is one of preferable embodiments of the present invention, because the total structure of the equipment for the halide decomposition is simplified.

The present invention will be illustrated with reference to the following nonlimitative examples. In the following Examples and Comparative Examples, where calcium hydroxide, together with potassium hydroxide, was used in the halide decomposition at a temperature of at least 580° C., it was found after the halide decomposition that calcium hydroxide does not exist in the reactor. In other words, calcium hydroxide mostly turned into calcium oxide at a temperature of at least 580° C., although it turned somewhat into calcium halide. Thus, in Tables 1, 4 and 6, the amounts of $Ca(OH)_2$ used for the halide decomposition were converted to those of CaO. Similarly, in the following Examples and Comparative Examples, where magnesium hydroxide, together with potassium hydroxide, was used in the halide decomposition at a temperature of at least 350° C., it was found after the halide decomposition that magnesium hydroxide does not exist in the reactor. In other words, magnesium hydroxide mostly turned into magnesium oxide at a temperature of at least 350° C., although it turned somewhat into magnesium halide. Thus, in Tables 1, 4 and 6, the amounts of $Mg(OH)_2$ used for the halide decomposition were converted into those of MgO.

The following Examples 1–23 and Comparative Examples 1–20 respectively are and are not in accordance with the first method of the present invention.

EXAMPLE 1

In this example, a halide gas ($C_2F_6$) was decomposed as follows, under conditions shown in Tables 1–2.

At first, 1 part by weight of a potassium hydroxide aqueous solution and 2 parts by weight of calcium hydroxide powder were mixed together to prepare a mixture in the form of paste. Then, this mixture was dried at 120° C. in an atmosphere of $N_2$ gas to obtain a solid. Then, this solid was pulverized, followed by sieving. With this, there was obtained particles having diameters of from 2 to 3 mm of this solid. The potassium hydroxide concentration of the potassium hydroxide aqueous solution was suitably adjusted, so that the thus obtained particles contained calcium hydroxide and potassium hydroxide in amounts shown in Table 1.

Then, a reactor that has an internal diameter of 22 mm and an axial length of 300 mm and is made of nickel was fully charged with the above-obtained particles. In the aftermentioned Examples and Comparative Examples where the decomposition temperature was higher than 900° C., there was used another reactor that has the same internal diameter and the same axial length as above, but is made of alumina. Then, the reactor was vertically disposed in a ringlike furnace equipped with a temperature adjusting mechanism. Then, the reactor was heated to and maintained at 600° C. during the halide decomposition. Then, a halide-containing gas was allowed to flow through the reactor from its bottom to top at a flow rate of 1,000 cc/min. Here, the gas volume is based on the standard state. There was provided, at a piping on the side of the reactor's bottom, a flow rate regulator having a valve for diluting a halide gas with $N_2$ gas and for supplying the reactor with the thus obtained halide-containing gas at a constant flow rate. There was provided a branch pipe at a main exhaust pipe connected to the reactor's top, for sampling the decomposition products. 5 minutes after the beginning of the halide decomposition, the halide-containing gas and the decomposition products were respectively sampled from an upstream position above the reactor and from the branch pipe. The sampled halide-containing gas and the decomposition products were analyzed with a gas chromatograph and an infrared absorption spectrophotometer to determine the halide concentration in the gases. The results are shown in Table 2.

EXAMPLES 2–3

In these examples, Example 1 was repeated except in that the decomposition temperature was respectively changed to 650° C. and 700° C., as shown in Table 2.

EXAMPLE 4

In this example, Example 1 was repeated except in that the decomposition temperature was changed to 750° C., as shown in Table 2, and that the halide decomposition further continued after a lapse of 5 minutes. In fact, after a lapse of 5 minutes, when the total equivalents of the halide contained in the gas supplied to the reactor reached to 56 per 100 equivalents of the total of CaO and KOH, with which the reactor was charged, a small amount of $C_2F_6$ was detected from the branch pipe of a downstream position below the reactor. Here, one molecule of CaO and one molecule of KOH respectively counted 2 equivalents and 1 equivalent. Furthermore, one atom of fluorine was counted 1 equivalent. When it reached to 71 per 100 equivalents of the same, the $C_2F_6$ concentration of the gas sampled from the branch pipe became the same as that of the gas sampled from an upstream position above the reactor. At this time, contents (solid) of the reactor were analyzed. With this, it was found that most of a solid occupying a space near the bottom of the reactor was made of $CaF_2$ and KF. This solid contained a small amount of CaO and KOH. This means that most of fluorine derived from harmful $C_2F_6$ exists in the form of harmless solids of $CaF_2$ and KF, by the halide decomposition of the present invention, and that a halide is highly reactive with a mixture of $Ca(OH)_2$ and KOH.

EXAMPLES 5–23

In these examples, Example 1 was repeated expect in that the reaction conditions were changed as shown in Tables 1–2.

COMPARATIVE EXAMPLES 1–3

In these comparative examples, Example 1 was repeated except in that 1 part by weight of a potassium hydroxide aqueous solution was replaced by 1 part by weight of water in the preparation of solid particles for the halide decomposition.

COMPARATIVE EXAMPLE 4

In this comparative example, Example 1 was repeated except in that 1 part by weight of a potassium hydroxide aqueous solution was replaced by 1 part by weight of a sodium hydroxide aqueous solution. The sodium hydroxide concentration of this solution was suitably adjusted, such that a mixture of calcium hydroxide and sodium hydroxide in the form of solid particles had 98 wt % of CaO and 2 wt % of NaOH, as shown in Table 1.

COMPARATIVE EXAMPLES 5–20

In these comparative examples, Example 1 was repeated except in that 1 part by weight of a potassium hydroxide aqueous solution was replaced by 1 part by weight of water in the preparation of a reactant and that other reaction conditions were changed as shown in Tables 1–2.

In the above-mentioned Examples and Comparative Examples where PFCs and CFCs, each having at least two carbon atoms in the molecule, were pyrolyzed, there was not detected low-molecular halogenated carbons from the branch pipe of a downstream position below the reactor. In all of the above-mentioned Examples, there were not detected HF, HCl and CO from the branch pipe.

TABLE 1

| | Chemical Composition of Mixture for Decomposing Halide (wt %) | | | |
|---|---|---|---|---|
| | CaO | MgO | KOH | NaOH |
| Com. Ex. 1 | 100 | 0 | 0 | 0 |
| Com. Ex. 2 | 100 | 0 | 0 | 0 |
| Com. Ex. 3 | 100 | 0 | 0 | 0 |
| Com. Ex. 4 | 98 | 0 | 0 | 2 |
| Com. Ex. 5 | 0 | 100 | 0 | 0 |
| Com. Ex. 6 | 0 | 100 | 0 | 0 |
| Example 1 | 98 | 0 | 2 | 0 |
| Example 2 | 98 | 0 | 2 | 0 |
| Example 3 | 98 | 0 | 2 | 0 |
| Example 4 | 98 | 0 | 2 | 0 |
| Example 5 | 98 | 0 | 2 | 0 |
| Example 6 | 98 | 0 | 2 | 0 |
| Example 7 | 0 | 98 | 2 | 0 |
| Example 8 | 99.95 | 0 | 0.05 | 0 |
| Example 9 | 99.9 | 0 | 0.1 | 0 |
| Example 10 | 80 | 0 | 20 | 0 |
| Example 11 | 60 | 0 | 40 | 0 |
| Com. Ex. 7 | 100 | 0 | 0 | 0 |
| Com. Ex. 8 | 100 | 0 | 0 | 0 |
| Com. Ex. 9 | 100 | 0 | 0 | 0 |
| Com. Ex. 10 | 100 | 0 | 0 | 0 |
| Example 12 | 98 | 0 | 2 | 0 |
| Example 13 | 98 | 0 | 2 | 0 |
| Example 14 | 98 | 0 | 2 | 0 |
| Example 15 | 98 | 0 | 2 | 0 |
| Com. Ex. 11 | 100 | 0 | 0 | 0 |
| Com. Ex. 12 | 100 | 0 | 0 | 0 |
| Com. Ex. 13 | 100 | 0 | 0 | 0 |
| Example 16 | 98 | 0 | 2 | 0 |
| Example 17 | 98 | 0 | 2 | 0 |
| Com. Ex. 14 | 100 | 0 | 0 | 0 |
| Com. Ex. 15 | 100 | 0 | 0 | 0 |
| Com. Ex. 16 | 100 | 0 | 0 | 0 |
| Example 18 | 98 | 0 | 2 | 0 |
| Example 19 | 98 | 0 | 2 | 0 |
| Com. Ex. 17 | 100 | 0 | 0 | 0 |
| Example 20 | 98 | 0 | 2 | 0 |
| Com. Ex. 18 | 100 | 0 | 0 | 0 |
| Example 21 | 98 | 0 | 2 | 0 |
| Com. Ex. 19 | 100 | 0 | 0 | 0 |
| Com. Ex. 20 | 100 | 0 | 0 | 0 |
| Example 22 | 98 | 0 | 2 | 0 |
| Example 23 | 98 | 0 | 2 | 0 |

TABLE 2

| | Reactor Temp. (°C.) | Halide Gas Type | Halide Conc. of Gas Before Decomposition (volume %) | Halide Conc. of Gas After Decomposition (volume %) |
|---|---|---|---|---|
| Com. Ex. 1 | 700 | $C_2F_6$ | 1.0 | 1.0 |
| Com. Ex. 2 | 750 | $C_2F_6$ | 1.0 | 0.53 |
| Com. Ex. 3 | 800 | $C_2F_6$ | 1.0 | 0.03 |
| Com. Ex. 4 | 750 | $C_2F_6$ | 1.0 | 0.51 |
| Com. Ex. 5 | 750 | $C_2F_6$ | 1.0 | 0.74 |
| Com. Ex. 6 | 800 | $C_2F_6$ | 1.0 | 0.11 |
| Example 1 | 600 | $C_2F_6$ | 1.0 | 1.0 |
| Example 2 | 650 | $C_2F_6$ | 1.0 | 0.48 |
| Example 3 | 700 | $C_2F_6$ | 1.0 | 0.06 |
| Example 4 | 750 | $C_2F_6$ | 1.0 | 0.00 |
| Example 5 | 750 | $C_2F_6$ | 5.0 | 0.00 |
| Example 6 | 750 | $C_2F_6$ | 10.0 | 0.03 |
| Example 7 | 750 | $C_2F_6$ | 1.0 | 0.00 |
| Example 8 | 750 | $C_2F_6$ | 1.0 | 0.00 |
| Example 9 | 750 | $C_2F_6$ | 1.0 | 0.00 |
| Example 10 | 750 | $C_2F_6$ | 1.0 | 0.00 |
| Example 11 | 750 | $C_2F_6$ | 1.0 | 0.00 |
| Com. Ex. 7 | 800 | $CF_4$ | 2.0 | 2.0 |
| Com. Ex. 8 | 900 | $CF_4$ | 2.0 | 1.5 |
| Com. Ex. 9 | 1,000 | $CF_4$ | 2.0 | 1.1 |
| Com. Ex. 10 | 1,100 | $CF_4$ | 2.0 | 0.7 |
| Example 12 | 700 | $CF_4$ | 2.0 | 2.0 |
| Example 13 | 800 | $CF_4$ | 2.0 | 0.6 |
| Example 14 | 850 | $CF_4$ | 2.0 | 0.02 |
| Example 15 | 900 | $CF_4$ | 2.0 | 0.00 |
| Com. Ex. 11 | 300 | $CCl_4$ | 1.0 | 0.93 |
| Com. Ex. 12 | 400 | $CCl_4$ | 1.0 | 0.36 |
| Com. Ex. 13 | 650 | $CCl_4$ | 1.0 | 0.05 |
| Example 16 | 300 | $CCl_4$ | 1.0 | 0.17 |
| Example 17 | 400 | $CCl_4$ | 1.0 | 0.00 |
| Com. Ex. 14 | 600 | $CCl_2FCClF_2$ | 1.0 | 0.77 |
| Com. Ex. 15 | 700 | $CCl_2FCClF_2$ | 1.0 | 0.30 |
| Com. Ex. 16 | 800 | $CCl_2FCClF_2$ | 1.0 | 0.00 |
| Example 18 | 500 | $CCl_2FCClF_2$ | 1.0 | 0.42 |
| Example 19 | 600 | $CCl_2FCClF_2$ | 1.0 | 0.00 |
| Com. Ex. 17 | 1,000 | $CHF_3$ | 1.0 | 0.11 |
| Example 20 | 800 | $CHF_3$ | 1.0 | 0.00 |
| Com. Ex. 18 | 800 | $CF_3Br$ | 1.0 | 0.65 |
| Example 21 | 700 | $CF_3Br$ | 1.0 | 0.00 |
| Com. Ex. 19 | 900 | $SF_6$ | 1.0 | 0.74 |
| Com. Ex. 20 | 1,000 | $SF_6$ | 1.0 | 0.00 |
| Example 22 | 500 | $SF_6$ | 1.0 | 0.69 |
| Example 23 | 600 | $SF_6$ | 1.0 | 0.00 |

The following Examples 24–30 and 41–47 are in accordance with the second method of the present invention, and the following Examples 31–40 are in accordance with the fourth method of the present invention. The following Comparative Examples 21–30 are not in accordance with the second to fifth methods of the present invention.

EXAMPLE 24

In this example, a halide gas ($C_2F_6$) was decomposed as follows, under conditions shown in Tables 3–5.

At first, there were prepared particles containing calcium hydroxide and potassium hydroxide in amounts as shown in Table 4, for decomposing the halide gas, in the same manner as that of Example 1.

A first column (reactor) made of stainless steel that has an internal diameter of 22 mm and a heatable portion having an effective axial length of 300 mm was used for removing oxygen from a halide-containing gas. The first column was charged with active carbon that is made from coconut husk and is in the form of particles having a diameter of from 2 to 3 mm, such that the first column had an active carbon layer having an axial length of 200 mm. Then, the first column was vertically disposed in a ringlike furnace equipped with a temperature adjusting mechanism.

A second column (reactor) made of nickel that has an internal diameter of 22 mm and a heatable portion having an effective axial length of 500 mm was used for decomposing the halide gas. The second column was charged with the above-prepared particles for decomposing the halide gas, such that the second column had a layer of these particles of an axial length of 300 mm. Then, the second column was vertically disposed in the furnace, and its upstream end was connected with the downstream end of the first column.

The first and second columns were respectively heated to and maintained at 500° C. and 750° C. during the oxygen removal and the halide decomposition. A halide-containing gas was allowed to flow downward through the first column and then through the second column at a flow rate of 1,000 cc/min. Here, the gas volume is based on the standard state. There was provided, at a piping on the side of the first column's entrance, a flow rate regulator having a valve for arbitrarily diluting a mixture of halide gas and oxygen with $N_2$ gas and for supplying the first and second columns with the thus obtained halide-containing gas at a constant flow rate. There was provided a first branch pipe at the top of the active carbon layer of the first column. There was further provided a second branch pipe at a main exhaust pipe connected to the exit of the second column, for sampling the decomposition products. 5 minutes after the beginning of the flow of halide-containing gas through the first and second columns, the halide-containing gas and the decomposition products were respectively sampled from an upstream position above the first column and from the second branch pipe below the second column. The sampled halide-containing gas and the decomposition products were analyzed with a gas chromatograph and an infrared absorption spectrophotometer. The results are shown in Table 5.

EXAMPLES 25–30

In these examples, Example 24 was repeated except in that the reducing agent type, the first column temperature, the initial halide concentration, and the initial oxygen concentration were modified as shown in Tables 3 and 5.

EXAMPLE 31

In this example, Example 24 was repeated except in that the first column was additionally charged with Si particles for converting $F_2$ gas (a very strong oxidizing gas), that the first column temperature was modified as shown in Table 3, and that $F_2$ gas was added to the halide-containing gas as shown in Table 5. In fact, the first column was additionally charged with Si particles having a diameter ranging from 3 to 5 mm. With this, a layer of Si particles, which has an axial length of about 100 mm, was formed on the top of the active carbon layer. In this example, $F_2$ gas was not detected from a gas sampled from the first branch pipe positioned 100 mm from the top of the first column, using potassium iodide paper.

Furthermore, $SiF_4$ was not detected from the second branch pipe.

EXAMPLES 32–40

In these examples, Example 31 was repeated except in that Si was replaced with other substances as shown in Table 3. In each of these examples, $F_2$ gas was not detected from a gas sampled from the first branch pipe, using potassium iodide paper. Furthermore, in Examples 32–35 and 40, $TiF_4$, $GeF_4$, $WF_6$, $MoF_6$ and $SiF_4$ were respectively not detected from the second branch pipe.

EXAMPLE 41

In this example, Example 25 was repeated except in that $Ca(OH)_2$ was replaced with $Mg(OH)_2$ as shown in Table 4.

EXAMPLES 42–47

In these examples, Example 25 was repeated except in that the second column's temperature and the halide type were modified, as shown in Tables 4–5.

COMPARATIVE EXAMPLES 21–22

In these comparative examples, Example 24 was repeated except in that only the second column was used for the halide decomposition. Furthermore, oxygen was omitted from the halide-containing gas in Comparative Example 21.

COMPARATIVE EXAMPLE 23

In this comparative example, Example 24 was repeated except in that the first column temperature was modified as shown in Table 3.

COMPARATIVE EXAMPLE 24

In this comparative example, Comparative Example 21 was repeated except in that $Ca(OH)_2$ was replaced with $Mg(OH)_2$ as shown in Table 4.

COMPARATIVE EXAMPLES 25–30

In these comparative examples, Comparative Example 22 was repeated except in that the second column's temperature and the halide type were modified as shown in Tables 4–5.

TABLE 3

| | Substance for Converting $F_2$ Gas in $1^{st}$ Column | Reducing Agent for Removing $O_2$ Gas in $1^{st}$ Column | $1^{st}$ Column Temp (°C.) |
|---|---|---|---|
| Com. Ex. 21 | — | — | — |
| Com. Ex. 22 | — | — | — |
| Com. Ex. 23 | — | Active Carbon A | 450 |
| Example 24 | — | Active Carbon A | 500 |
| Example 25 | — | Active Carbon A | 700 |
| Example 26 | — | Active Carbon A | 700 |
| Example 27 | — | Active Carbon B | 700 |
| Example 28 | — | Active Carbon C | 700 |
| Example 29 | — | Fe Powder | 700 |
| Example 30 | — | Ni Powder | 700 |
| Example 31 | Si | Active Carbon A | 700 |
| Example 32 | Ti | Active Carbon A | 700 |
| Example 33 | Ge | Active Carbon A | 700 |
| Example 34 | W | Active Carbon A | 700 |
| Example 35 | Mo | Active Carbon A | 700 |
| Example 36 | Fe | Active Carbon A | 700 |
| Example 37 | Mn | Active Carbon A | 700 |
| Example 38 | Co | Active Carbon A | 700 |
| Example 39 | Zn | Active Carbon A | 700 |
| Example 40 | $Si_3N_4$ | Active Carbon A | 700 |
| Com. Ex. 24 | — | — | — |
| Example 41 | — | Active Carbon C | 700 |
| Com. Ex. 25 | — | — | — |

TABLE 3-continued

| | Substance for Converting $F_2$ Gas in $1^{st}$ Column | Reducing Agent for Removing $O_2$ Gas in $1^{st}$ Column | $1^{st}$ Column Temp (°C.) |
|---|---|---|---|
| Example 42 | — | Active Carbon A | 700 |
| Com Ex. 26 | — | — | — |
| Example 43 | — | Active Carbon A | 700 |
| Com. Ex. 27 | — | — | — |
| Example 44 | — | Active Carbon A | 700 |
| Com. Ex. 28 | — | — | — |
| Example 45 | — | Active Carbon A | 700 |
| Com. Ex. 29 | — | — | — |
| Example 46 | — | Active Carbon A | 700 |
| Com. Ex. 30 | — | — | — |
| Example 47 | — | Active Carbon A | 700 |

Active Carbon A: Active carbon in the form of particles made from coconut husk.
Active Carbon B: Active carbon in the form of fibers.
Active Carbon C: Active carbon in the form of spheres made from coal.

TABLE 4

| | Chemical Composition of Mixture for $2^{nd}$ Column Decomposing Halide in $2^{nd}$ Column | | $2^{nd}$ Column Temp. (°C.) |
|---|---|---|---|
| Com. Ex. 21 | CaO (98 wt %) | KOH (2 wt %) | 750 |
| Com. Ex. 22 | CaO (98 wt %) | KOH (2 wt %) | 750 |
| Com. Ex. 23 | CaO (98 wt %) | KOH (2 wt %) | 750 |
| Example 24 | CaO (98 wt %) | KOH (2 wt %) | 750 |
| Example 25 | CaO (98 wt %) | KOH (2 wt %) | 750 |
| Example 26 | CaO (98 wt %) | KOH (2 wt %) | 750 |
| Example 27 | CaO (98 wt %) | KOH (2 wt %) | 750 |
| Example 28 | CaO (98 wt %) | KOH (2 wt %) | 750 |
| Example 29 | CaO (98 wt %) | KOH (2 wt %) | 750 |
| Example 30 | CaO (98 wt %) | KOH (2 wt %) | 750 |
| Example 31 | CaO (98 wt %) | KOH (2 wt %) | 750 |
| Example 32 | CaO (98 wt %) | KOH (2 wt %) | 750 |
| Example 33 | CaO (98 wt %) | KOH (2 wt %) | 750 |
| Example 34 | CaO (98 wt %) | KOH (2 wt %) | 750 |
| Example 35 | CaO (98 wt %) | KOH (2 wt %) | 750 |
| Example 36 | CaO (98 wt %) | KOH (2 wt %) | 750 |
| Example 37 | CaO (98 wt %) | KOH (2 wt %) | 750 |
| Example 38 | CaO (98 wt %) | KOH (2 wt %) | 750 |
| Example 39 | CaO (98 wt %) | KOH (2 wt %) | 750 |
| Example 40 | CaO (98 wt %) | KOH (2 wt %) | 750 |
| Com. Ex. 24 | MgO (98 wt %) | KOH (2 wt %) | 750 |
| Example 41 | MgO (98 wt %) | KOH (2 wt %) | 750 |
| Com. Ex. 25 | CaO (98 wt %) | KOH (2 wt %) | 900 |
| Example 42 | CaO (98 wt %) | KOH (2 wt %) | 900 |
| Com. Ex. 26 | CaO (98 wt %) | KOH (2 wt %) | 400 |
| Example 43 | CaO (98 wt %) | KOH (2 wt %) | 400 |
| Com. Ex. 27 | CaO (98 wt %) | KOH (2 wt %) | 600 |
| Example 44 | CaO (98 wt %) | KOH (2 wt %) | 600 |
| Com. Ex. 28 | CaO (98 wt %) | KOH (2 wt %) | 800 |
| Example 45 | CaO (98 wt %) | KOH (2 wt %) | 800 |
| Com. Ex. 29 | CaO (98 wt %) | KOH (2 wt %) | 700 |
| Example 46 | CaO (98 wt %) | KOH (2 wt %) | 700 |
| Com. Ex. 80 | CaO (98 wt %) | KOH (2 wt %) | 600 |
| Example 47 | CaO (98 wt %) | KOH (2 wt %) | 600 |

TABLE 5

| | Halide Gas Type | Initial Halide Conc. Of Gas (vol. %) | Initial $O_2$ Conc. Of Gas (vol. %) | Initial $F_2$ Conc. Of Gas (vol. %) | Final Halide Conc. Of Gas (vol. %) |
|---|---|---|---|---|---|
| Com. Ex. 21 | $C_2F_6$ | 1.0 | 0 | 0 | 0.00 |
| Com. Ex. 22 | $C_2F_6$ | 1.0 | 1.0 | 0 | 1.0 |
| Com. Ex. 23 | $C_2F_6$ | 1.0 | 1.0 | 0 | 0.45 |
| Example 24 | $C_2F_6$ | 1.0 | 1.0 | 0 | 0.00 |
| Example 25 | $C_2F_6$ | 1.0 | 1.0 | 0 | 0.00 |

TABLE 5-continued

| | Halide Gas Type | Initial Halide Conc. Of Gas (vol. %) | Initial $O_2$ Conc. Of Gas (vol. %) | Initial $F_2$ Conc. Of Gas (vol. %) | Final Halide Conc. Of Gas (vol. %) |
|---|---|---|---|---|---|
| Example 26 | $C_2F_6$ | 5.0 | 10.0 | 0 | 0.00 |
| Example 27 | $C_2F_6$ | 1.0 | 1.0 | 0 | 0.00 |
| Example 28 | $C_2F_6$ | 1.0 | 1.0 | 0 | 0.00 |
| Example 29 | $C_2F_6$ | 1.0 | 1.0 | 0 | 0.00 |
| Example 30 | $C_2F_6$ | 1.0 | 1.0 | 0 | 0.00 |
| Example 31 | $C_2F_6$ | 1.0 | 1.0 | 0.2 | 0.00 |
| Example 32 | $C_2F_6$ | 1.0 | 1.0 | 0.2 | 0.00 |
| Example 33 | $C_2F_6$ | 1.0 | 1.0 | 0.2 | 0.00 |
| Example 34 | $C_2F_6$ | 1.0 | 1.0 | 0.2 | 0.00 |
| Example 35 | $C_2F_6$ | 1.0 | 1.0 | 0.2 | 0.00 |
| Example 36 | $C_2F_6$ | 1.0 | 1.0 | 0.2 | 0.00 |
| Example 37 | $C_2F_6$ | 1.0 | 1.0 | 0.2 | 0.00 |
| Example 38 | $C_2F_6$ | 1.0 | 1.0 | 0.2 | 0.00 |
| Example 39 | $C_2F_6$ | 1.0 | 1.0 | 0.2 | 0.00 |
| Example 40 | $C_2F_6$ | 1.0 | 1.0 | 0.2 | 0.00 |
| Com. Ex. 24 | $C_2F_6$ | 1.0 | 1.0 | 0 | 1.0 |
| Example 41 | $C_2F_6$ | 1.0 | 1.0 | 0 | 0.00 |
| Com. Ex. 25 | $CF_4$ | 1.0 | 1.0 | 0 | 1.0 |
| Example 42 | $CF_4$ | 1.0 | 1.0 | 0 | 0.00 |
| Com. Ex. 26 | $CCl_4$ | 1.0 | 1.0 | 0 | 1.0 |
| Example 43 | $CCl_4$ | 1.0 | 1.0 | 0 | 0.00 |
| Com. Ex. 27 | $CCl_2FCClF_2$ | 1.0 | 1.0 | 0 | 1.0 |
| Example 44 | $CCl_2FCClF_2$ | 1.0 | 1.0 | 0 | 0.00 |
| Com. Ex. 28 | $CHF_3$ | 1.0 | 1.0 | 0 | 1.0 |
| Example 45 | $CHF_3$ | 1.0 | 1.0 | 0 | 0.00 |
| Com. Ex. 29 | $CF_3Br$ | 1.0 | 1.0 | 0 | 1.0 |
| Example 46 | $CF_3Br$ | 1.0 | 1.0 | 0 | 0.00 |
| Com. Ex. 30 | $SF_6$ | 1.0 | 1.0 | 0 | 1.0 |
| Example 47 | $SF_6$ | 1.0 | 1.0 | 0 | 0.00 |

The following Examples 48–57 are in accordance with the third method of the present invention.

EXAMPLE 48

In this example, Example 24 was repeated except in that only the second column was used for the oxygen removal and the halide decomposition. In fact, 3 parts by volume of Active Carbon A in the form of particles was mixed with 2 parts by volume of particles containing calcium hydroxide and potassium hydroxide in amounts as shown in Table 6 for decomposing the halide gas. The resultant mixture was put into the second column to have a layer of this mixture of 500 mm.

EXAMPLE 49

In this example, Example 48 was repeated except in that $Ca(OH)_2$ was replaced with $Mg(OH)_2$.

EXAMPLE 50

In this example, Example 48 was repeated except in that Active Carbon A was replaced with Fe powder.

EXAMPLE 51

In this example, Example 48 was repeated except in that the initial halide and oxygen concentrations of the halide-containing gas were modified as shown in Table 7.

EXAMPLES 52–57

In these examples, Example 48 was repeated except in that the second column's temperature and the halide gas type were modified as shown in Tables 6–7.

TABLE 6

|  | Chemical Composition of Mixture for Decomposing Halide in 2$^{nd}$ Column | | Reducing Agent Type in 2$^{nd}$ Column | 2$^{nd}$ Column Temp. (°C.) |
|---|---|---|---|---|
| Example 48 | CaO (98 wt %) | KOH (2 wt %) | Active Carbon A | 750 |
| Example 49 | MgO (98 wt %) | KOH (2 wt %) | Active Carbon A | 750 |
| Example 50 | CaO (98 wt %) | KOH (2 wt %) | Fe Powder | 750 |
| Example 51 | CaO (98 wt %) | KOH (2 wt %) | Active Carbon A | 750 |
| Example 52 | CaO (98 wt %) | KOH (2 wt %) | Active Carbon A | 900 |
| Example 53 | CaO (98 wt %) | KOH (2 wt %) | Active Carbon A | 400 |
| Example 54 | CaO (98 wt %) | KOH (2 wt %) | Active Carbon A | 600 |
| Example 55 | CaO (98 wt %) | KOH (2 wt %) | Active Carbon A | 800 |
| Example 56 | CaO (98 wt %) | KOH (2 wt %) | Active Carbon A | 700 |
| Example 57 | CaO (98 wt %) | KOH (2 wt %) | Active Carbon A | 600 |

Active Carbon A: Active carbon in the form of particles made from coconut husk.

TABLE 7

| | Halide Gas Type | Initial Halide Conc. Of Gas (vol. %) | Initial $O_2$ Conc. Of Gas (vol. %) | Initial $F_2$ Conc. Of Gas (vol. %) | Final Halide Conc. Of Gas (vol. %) |
|---|---|---|---|---|---|
| Example 48 | $C_2F_6$ | 1.0 | 1.0 | 0 | 0.00 |
| Example 49 | $C_2F_6$ | 1.0 | 1.0 | 0 | 0.00 |
| Example 50 | $C_2F_6$ | 1.0 | 1.0 | 0 | 0.00 |
| Example 51 | $C_2F_6$ | 5.0 | 10.0 | 0 | 0.00 |
| Example 52 | $CF_4$ | 1.0 | 1.0 | 0 | 0.00 |
| Example 53 | $CCl_4$ | 1.0 | 1.0 | 0 | 0.00 |
| Example 54 | $CCl_2FCClF_2$ | 1.0 | 1.0 | 0 | 0.00 |
| Example 55 | $CHF_3$ | 1.0 | 1.0 | 0 | 0.00 |
| Example 56 | $CF_3Br$ | 1.0 | 1.0 | 0 | 0.00 |
| Example 57 | $SF_6$ | 1.0 | 1.0 | 0 | 0.00 |

What is claimed is:

1. A method for decomposing at least one halogenated compound selected from the group consisting of chlorocarbons, chlorofluorocarbons, perfluorocarbons and $SF_6$ contained in a gas, the method comprising the step of:

(a) bringing the gas into contact, at a temperature of at least 300° C., with a first mixture which is in the form of a solid and consists essentially of potassium hydroxide and at least one compound selected from the group consisting of alkali-earth-metal oxides and alkali-earth-metal hydroxides, said potassium hydroxide and said at least one compound being respectively in amounts of 0.05–40 wt % and 60–99.95 wt % based on the total weight of said potassium hydroxide and said at least one compound.

2. A method according to claim 1, wherein said temperature is within a range from 300° to 900° C.

3. A method according to claim 1, wherein said alkali-earth-metal hydroxides are calcium hydroxide and magnesium hydroxide, and said alkali-earth-metal oxides are calcium oxide and magnesium oxide.

4. A method according to claim 1, wherein said potassium hydroxide is in an amount of from 0.1 to 20 wt %.

5. A method according to claim 1, wherein said first mixture is prepared by a method comprising the steps of:

(1) mixing a powder of said at least one compound with an aqueous solution containing said potassium hydroxide to prepare a second mixture;

(2) drying said second mixture to prepare a solid; and (3) pulverizing said solid to prepare said first mixture that is in a form of particles.

6. A method for decomposing at least one halogenated compound selected from the group consisting of chlorocarbons, chlorofluorocarbons, perfluorocarbons and $SF_6$ contained in a gas, the method comprising the steps of:

(a) bringing the gas that further contains oxygen into contact, at a first temperature of at least 500° C., with at least one substance selected from the group consisting of active carbon, iron powder and nickel powder, to remove said oxygen from the gas; and (b) bringing the gas that is free of said oxygen into contact, at a second temperature of at least 300° C., with a first mixture which is in the form of a solid and consists essentially of potassium hydroxide and at least one compound selected from the group consisting of alkali-earth-metal oxides and alkali-earth-metal hydroxides, said potassium hydroxide and said at least one compound being respectively in amounts of 0.05–40 wt % and 60–99.95 wt % based on the total weight of said potassium hydroxide and said at least one compound.

7. A method according to claim 6, wherein said first and second temperatures are respectively within a range from 500° to 900° C. and within a range from 300° to 900° C.

8. A method according to claim 6, wherein said potassium hydroxide is in an amount of from 0.1 to 20 wt %.

9. A method for decomposing at least one halogenated compound selected from the group consisting of chlorocarbons, chlorofluorocarbons, perfluorocarbons and $SF_6$ contained in a gas, the method comprising the step of:

(a) bringing the gas that further contains oxygen into contact, at a temperature of at least 500° C., with a mixture of at least one substance selected from the group consisting of active carbon, iron powder and nickel powder and a mixture of potassium hydroxide and at least one compound selected from the group consisting of alkali-earth-metal oxides and alkali-earth-metal hydroxides, said mixture being in the form of a solid, said potassium hydroxide and said at least one compound being respectively in amounts of from 0.05 to 40 wt % and of from 60 to 99.95 wt % based on the total weight of said potassium hydroxide and said at least one compound.

10. A method according to claim 9, wherein said temperature is within a range of from 500° to 900° C.

11. A method for decomposing at least one halogenated compound selected from the group consisting of chlorocarbons, chlorofluorocarbons, perfluorocarbons and $SF_6$ contained in a gas, the method comprising the steps of:

(a) bringing the gas that further contains oxygen and an oxidizing gas other than said oxygen, into contact, at a first temperature of at least 300° C., with at least one first substance selected from the group consisting of Si, Ti, Ge, W, Mo, Fe, Mn, Co, Zn, Sn, B, Zr and compounds of these elements, except oxides of these elements, said oxidizing gas other than said oxygen being selected from the group consisting of fluorine, nitrogen dioxide, ClF, ClF$_3$, ClF$_5$, BrF$_3$, BrF$_5$, IF$_5$, IF$_7$ and mixtures thereof, such that said oxidizing gas turns into a first compound;

(b) bringing the gas into contact, at a second temperature of at least 500° C., with at least one second substance selected from the group consisting of active carbon, iron powder and nickel powder, to remove said oxygen from the gas, said at least one second substance being unreactive with said first compound; and (c) bringing the gas that is free of s aid oxygen into contact, at a third temperature of at least 300° C., with a first mixture which is in the form of solid and consists essentially of potassium hydroxide and at least one compound selected from the group consisting of alkali-earth-metal oxides and alkali-earth-metal hydroxides, said potassium hydroxide and said at least one compound being respectively in amounts of 0.05–40 wt % and 60–99.95 wt % based on the total weight of said potassium hydroxide and said at least one compound.

12. A method according to claim 11, wherein said at least one second substance is active carbon, which is unreactive with said first compound.

13. A method according to claim 11, wherein said first, second and third temperatures are respectively within ranges of from 300° to 800° C., of from 500° to 900° C., and of from 300° to 900° C.

14. A method according to claim 11, wherein said oxidizing gas is fluorine gas.

15. A method for decomposing at least one halogenated compound selected from the group consisting of chlorocarbons, chlorofluorocarbons, perfluorocarbons and SF$_6$ contained in a gas, the method comprising the steps of:

(a) bringing the gas that further contains oxygen and an oxidizing gas other than said oxygen, into contact, at a first temperature of at least 300° C., with at least one first substance selected from the group consisting of Si, Ti, Ge, W, Mo, Fe, Mn, Co, Zn, Sn, B, Zr and compounds of these elements, except oxides of these elements, said oxidizing gas other than said oxygen being selected from the group consisting of fluorine, nitrogen dioxide, ClF, ClF$_3$, ClF$_5$, BrF$_3$, BrF$_5$, IF$_5$, IF$_7$ and mixtures thereof, such that said oxidizing gas turns into a first compound; and (b) bringing the gas into contact, at a second temperature of at least 500° C., with a mixture of an at least one second substance selected from the group consisting of active carbon, iron powder and nickel powder, potassium hydroxide, and at least one compound selected from the group consisting of alkali-earth-metal oxides and alkali-earth-metal hydroxides, said mixture being in the form of a solid, said potassium hydroxide and said at least one compound being respectively in amounts of from 0.05 to 40 wt % and of from 60 to 99.95 wt % based on the total weight of said potassium hydroxide and said at least one compound.

16. A method according to claim 15, wherein said at least one second substance is active carbon, which is unreactive with said first compound.

17. A method according to claim 15, wherein said first and second temperatures are respectively within ranges of from 300° to 800° C., and of from 500° to 900° C.

18. A method according to claim 15, wherein said oxidizing gas is fluorine gas.

* * * * *